(12) United States Patent
Nowak (10) Patent No.: US 8,906,436 B2
(45) Date of Patent: Dec. 9, 2014

(54) SINGLE SERVE BEVERAGE ADDITIVE CARTRIDGE

(71) Applicant: Kelly M. Nowak, West Haven, CT (US)

(72) Inventor: Kelly M. Nowak, West Haven, CT (US)

(73) Assignee: PTC-Innovations, LLC, West Haven, CT (US)

( * ) Notice: Subject to any disclaimer, the term of this patent is extended or adjusted under 35 U.S.C. 154(b) by 0 days.

(21) Appl. No.: 14/045,122

(22) Filed: Oct. 3, 2013

(65) Prior Publication Data

US 2014/0272016 A1    Sep. 18, 2014

Related U.S. Application Data

(60) Provisional application No. 61/798,655, filed on Mar. 15, 2013.

(51) Int. Cl.
  *B65B 29/02* (2006.01)
  *B65D 85/804* (2006.01)
  *A47J 31/40* (2006.01)

(52) U.S. Cl.
  CPC ........... *B65D 85/8043* (2013.01); *A47J 31/407* (2013.01)
  USPC ............................................. 426/78; 99/295

(58) Field of Classification Search
  CPC .................................................. B65D 85/8043
  USPC ......... 99/295, 279, 291, 316; 423/78, 79, 435
  See application file for complete search history.

(56) References Cited

U.S. PATENT DOCUMENTS

| 4,867,993 | A | * | 9/1989 | Nordskog ........................ 426/77 |
| 5,325,765 | A | | 7/1994 | Sylvan et al. |
| 5,840,189 | A | | 11/1998 | Sylvan et al. |
| 6,079,315 | A | | 6/2000 | Beaulieu et al. |
| 6,142,063 | A | | 11/2000 | Beaulieu et al. |
| 6,182,554 | B1 | | 2/2001 | Beaulieu et al. |
| D452,433 | S | | 12/2001 | Lazaris |
| D452,434 | S | | 12/2001 | Sweeney |
| 6,440,256 | B1 | | 8/2002 | Gordon et al. |
| D474,110 | S | | 5/2003 | Sweeney |
| D474,111 | S | | 5/2003 | Lazaris |
| 6,589,577 | B2 | | 7/2003 | Lazaris et al. |
| 6,606,938 | B2 | | 8/2003 | Taylor |
| 6,607,762 | B2 | | 8/2003 | Lazaris et al. |
| 6,645,537 | B2 | | 11/2003 | Sweeney et al. |
| 6,658,989 | B2 | | 12/2003 | Sweeney et al. |
| 6,708,600 | B2 | | 3/2004 | Winkler et al. |
| 7,856,922 | B2 | | 12/2010 | Tjen |
| D637,484 | S | | 5/2011 | Winkler |
| D647,398 | S | | 10/2011 | Winkler |
| D647,399 | S | | 10/2011 | Winkler |
| 8,221,813 | B2 | | 7/2012 | Boul |
| 8,322,271 | B2 | | 12/2012 | Glucksman et al. |

(Continued)

FOREIGN PATENT DOCUMENTS

EP    0 756 844    *  2/1997    .............. A47J 31/40

*Primary Examiner* — Rena L Dye
*Assistant Examiner* — Chaim Smith
(74) *Attorney, Agent, or Firm* — Kelly M. Nowak (57) ABSTRACT

Beverage additive cartridges, beverage brewing systems and methods of brewing a beverage whereby a beverage additive cartridge containing an ingredient is used in combination with a beverage brewing cartridge to add the ingredient of the additive cartridge to the brewed fluid flow of the brewing cartridge. The resultant brew is an ingredient-brewed fluid mixture that outflows a brewing machine via an outlet probe.

20 Claims, 8 Drawing Sheets

(56) References Cited

U.S. PATENT DOCUMENTS

| | | |
|---|---|---|
| 8,361,527 B2 | 1/2013 | Winkler et al. |
| 2003/0056661 A1* | 3/2003 | Hu et al. .................. 99/495 |
| 2005/0066819 A1 | 3/2005 | Cooke |
| 2005/0076784 A1* | 4/2005 | Tebo et al. ................ 99/279 |
| 2005/0172822 A1* | 8/2005 | Macchi et al. ............. 99/295 |
| 2006/0180030 A1* | 8/2006 | Bates et al. ............... 99/323 |
| 2006/0236871 A1* | 10/2006 | Ternite et al. ............. 99/295 |
| 2007/0071869 A1* | 3/2007 | Knitel et al. ............. 426/595 |
| 2007/0259073 A1* | 11/2007 | Scarchilli et al. .......... 426/78 |
| 2008/0148958 A1* | 6/2008 | Koeling et al. ............ 99/323 |
| 2008/0171108 A1* | 7/2008 | Dierikx .................... 426/77 |
| 2008/0260927 A1* | 10/2008 | Steenhof et al. .......... 426/569 |
| 2009/0007792 A1 | 1/2009 | Glucksman et al. |
| 2009/0007793 A1 | 1/2009 | Glucksman et al. |
| 2010/0028495 A1 | 2/2010 | Novak et al. |
| 2010/0068361 A1* | 3/2010 | Bongers et al. ........... 426/431 |
| 2010/0196545 A1 | 8/2010 | Buffet et al. |
| 2010/0303964 A1 | 12/2010 | Beaulieu et al. |
| 2011/0076361 A1 | 3/2011 | Peterson et al. |
| 2011/0168029 A1 | 7/2011 | Fulco |
| 2011/0226343 A1 | 9/2011 | Novak et al. |
| 2011/0274802 A1 | 11/2011 | Rivera |
| 2011/0305801 A1 | 12/2011 | Beer |
| 2012/0058226 A1 | 3/2012 | Winkler et al. |
| 2012/0070542 A1 | 3/2012 | Camera et al. |
| 2012/0097602 A1 | 4/2012 | Tedford |

* cited by examiner

SINGLE SERVE BEVERAGE ADDITIVE CARTRIDGE

This application claims priority to U.S. Provisional Application No. 61/798,655 filed on Mar. 15, 2013, the disclosure of which is hereby incorporated by reference herein in its entirety.

BACKGROUND OF THE INVENTION

1. Field of the Invention

The present invention is directed to beverage filter cartridges, and in particular, to a cartridge that attaches to a single serve beverage filter cartridge for adding a constituent to an out-flowing beverage and methods of making and implementing the same.

2. Description of Related Art

A variety of automatic brewers currently exist in the market for brewing hot and/or cold beverages. Several of these brewers are for use with single serve beverage filter cartridges. Today, numerous different types of single serve beverage filter cartridges exist, which may be either disposable or reusable. Disposable single serve beverage cartridges have a significant impact on coffee sales.

In the manufacture of disposable single serve beverage filter cartridges, an impermeable yieldably-piercable cup-shaped outer container is provided with a filter therein containing an ingredient to be brewed. A foil type material is adhered to the top of the outer container to hermetically seal the resultant disposable cartridge and its contents. In use, the sealed cartridge is placed inside a cup shaped housing of a brewing machine followed by closing the brewer lid to entrap the cartridge in the housing. As the lid is closed, a tubular inlet probe on the brewer lid pierces the foil top of the cartridge, and a tubular outlet probe residing at the bottom of the housing pierces the bottom of the cartridge. The inlet probe admits heated liquid under pressure into a chamber of the cartridge having the ingredient to be brewed for the infusion thereof. The resulting brewed beverage passes through the filter into another chamber of such cartridge, from which it exits via the outlet probe for delivery into an underlying container (e.g., cup).

While these types of single serve beverage filter cartridges are replete in today's market, they are plagued by the selection and variety of ingredient flavors available for purchase. For instance, certain coffee brand manufacturers sell a limited selection of flavored coffees. This is in part due to customer demand, but largely due to manufacturing limitations and costs. In manufacturing single serve beverage cartridges containing a selected flavor of coffee, cross-contamination thereof with other flavorings or flavored coffee is highly undesirable. A contaminated batch of coffee typically yields an unsellable product that must be scrapped, thereby leading to increased manufacturing costs and lost profits. To avoid batch cross-contamination manufacturers often designate manufacturing facilities to single coffee flavors. This limits the variety of flavored single serve beverages the manufacturer can economically and feasibly produce.

Accordingly, there continues to be a need in the art for new apparatus, systems, and methods for flavoring or adding an ingredient to the liquid outflow from disposable and reusable single serve beverage cartridges.

SUMMARY OF THE INVENTION

Bearing in mind the problems and deficiencies of the prior art, it is therefore an object of the present invention to provide a beverage additive cartridge, for use with a beverage brewing cartridge, that includes a container having a first surface area with sidewalls extending from the first surface area. The container may have a shape corresponding to an exterior shape of the beverage brewing cartridge. The beverage additive cartridge is in communication with the beverage brewing cartridge (i.e., directly (e.g., connected to, adhered to, fastened to, affixed to, etc.) or indirectly (e.g., adjacent to, near, next to, etc.) The beverage additive cartridge further includes an ingredient residing inside therein for adding to a brewed fluid of the beverage brewing cartridge to generate an ingredient-brewed fluid mixture.

In other embodiments of the invention, the invention is directed to beverage brewing system that includes beverage brewing cartridge containing a material to be brewed. The system also includes beverage additive cartridge retaining an ingredient for adding to a brewed fluid of the beverage brewing cartridge to generate an ingredient-brewed fluid mixture. The system further includes a connection that provides the beverage additive cartridge in communication with the beverage brewing cartridge.

In other embodiments the invention is directed to methods of brewing a beverage by providing a beverage brewing cartridge containing a material to be brewed. A beverage additive cartridge is secured to the beverage brewing cartridge. This beverage additive cartridge contains an ingredient. The beverage brewing cartridge and the beverage additive cartridge are compressed together via a housing of a brewing machine, and probes of the brew machine pierce one or both of the beverage brewing cartridge and the beverage additive cartridge. Fluid flows into the beverage brewing cartridge via an inlet probe to generate a brewed fluid flow, and fluid contacts the ingredient within the beverage additive cartridge to generate an ingredient containing fluid flow. These brewed fluid flow and ingredient containing fluid flow are combined to generate an ingredient-brewed fluid mixture that outflows the brewing machine.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1A-8B of the drawings in which like numerals refer to like features of the invention. Terms such as "upper", "lower", "top", "bottom", "inner", "outer", "inward or inwardly", "outward or outwardly", "vertical", "horizontal", and the like, when used herein, refer to the positions of the respective elements shown in the accompanying figures and the present invention is not limited to such positions.

Figure 1A:
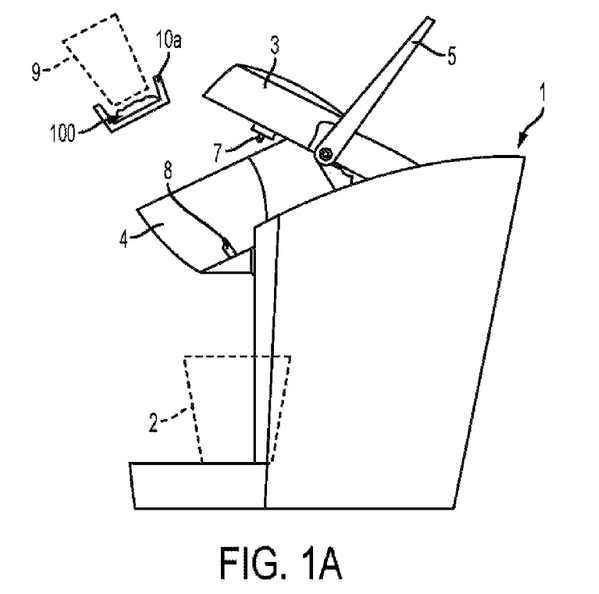
FIGS. 1A-B are side views of various single serve beverage additive cartridges 10a, 10b according to one or more embodiments of the present invention.
Figure 1B:
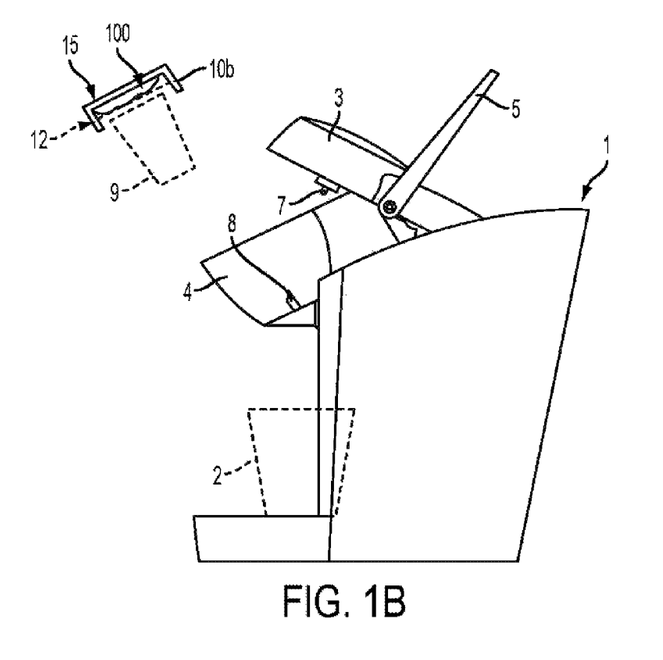
Figure 2A:
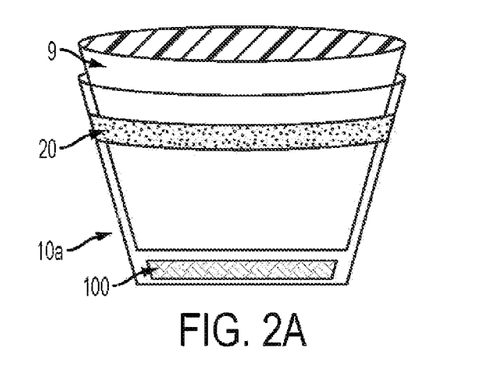
FIG. 2A is a perspective view of an additive cartridge attached to a bottom portion of a conventional brew cartridge according to one or more embodiments of the invention.
Figure 3A:
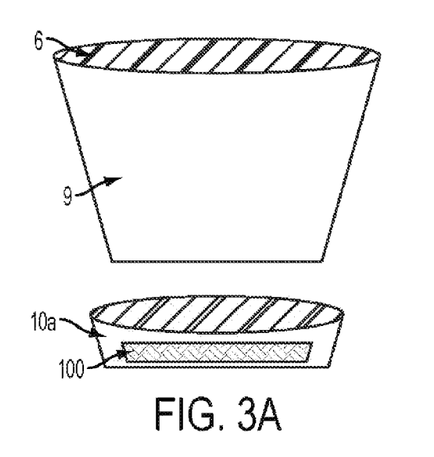
FIGS. 3A-B are perspective views of other additive cartridges attached to a bottom portion of a conventional brew cartridge according to other embodiments of the invention.
Figure 3B:
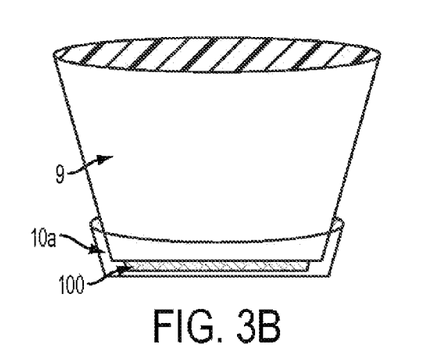

Referring to FIGS. 1A-B, the various embodiments of the invention are directed to single serve beverage additive containers or cartridges 10a, 10b (referred to herein generally as "additive cartridges 10"), which may be used in combination with a conventional single serve beverage brew cartridge 9. The various single serve beverage additive cartridges 10a, 10b of the invention may be used in a single serve brewing machine 1 having a lid 3 and cup shaped housing 4. A conventional single serve beverage brew cartridge 9 containing a constituent to be brewed (e.g., coffee, tea, hot chocolate, cider, soup, etc.) is provided inside the cup shaped housing 4 of the brewer 1 along with one or more single serve beverage additive cartridges 10 of the invention. As such, the beverage brew cartridge 9 and the beverage additive cartridges 10 are communication with each other, which may be direct communication or indirect communication.

The brewer lid 3 is moved downward via handle 5 to enclose the brew cartridge 9 and the one or more additive cartridges 10 of the invention within the cup shaped housing 4. The constituent to be brewed within the brew cartridge 9 may then be brewed, whereby an ingredient residing within the additive cartridges 10 of the invention is combined with and/or added to the liquid outflow from such brew cartridge 9 (e.g., see, FIG. 1A) and/or added to the brewed ingredient within the brew cartridge 9 (e.g., see, FIG. 1B) for outflow from the brew machine.

FIGS. 1A and 2A-3B show one or more embodiments of the invention wherein an ingredient 100 of additive cartridge 10a may be added to the liquid outflow from the brew cartridge 9. In these embodiments a single serve beverage additive cartridge 10a containing the ingredient 100 may be provided into the cup shaped housing 4 prior to providing a beverage brew cartridge 9 containing a constituent to be brewed therein. As such, the additive cartridge 10a of the invention resides under brew cartridge 9.

Once a brew cartridge 9 resides over the additive cartridge 10a within the brewer housing 4, the lid 3 is closed via handle 5. In doing so, a tubular inlet probe 7 attached to the lid 3 pierces a top foil layer 6 of the beverage brew cartridge 9, while a tubular outlet probe 8 at the bottom of the cup shaped housing 4 pierces both the additive cartridge 10a of the invention and the brew cartridge 9. As the lid 3 is closed, upward and downward pressures applied to both the beverage brew cartridge 9 and the additive cartridge 10a cause the brew cartridge 9 to be inserted into the instant additive cartridge 10a. It should be appreciated that an end-user may also manually insert or attach the brew cartridge 9 into/to the additive cartridge 10a prior to use thereof (i.e., prior to insertion into the brewer), whereby applied pressure in housing 4 provides additional force to insert the brew cartridge 9 into the additive cartridge 10a.

The tubular inlet probe 7 has one or more openings therein for introducing a fluid flow (typically water) into the brew cartridge 9. For ease of understanding the invention, the inflowing fluid flow will be referred to herein as water. Water is retained within a first compartment of the brew cartridge 9 containing the constituent to be brewed within a filter material. The brewed fluid flow passes from the first compartment through the filter material and into a second compartment of the brew cartridge 9 residing under such filter material. This brewed fluid flow also passes into the underlying additive cartridge 10a and directly contacts the ingredient 100 residing therein. The brewed fluid flow interacts and mixes with the ingredient 100 from additive cartridge 10a inside the brewer housing 4 to generate an ingredient-brewed mixture fluid. For instance, wherein the ingredient 100 is a flavoring component, the brewed fluid from brew cartridge 9 is mixed with and flavored by ingredient 100 from the additive cartridge 10a (i.e., flavoring cartridge) to generate a flavored, brewed fluid. The tubular outlet probe 8 of the brewing machine also has one or more openings therein (e.g., see, bottom opening of probe 8 in FIG. 6C), or there-around its surface area, to allow the ingredient-brewed mixture fluid outflow from the brewer housing 4 and into an underlying receptacle 2 (e.g., a glass, cup, mug, bowl, pitcher, etc.)

Figure 4A:
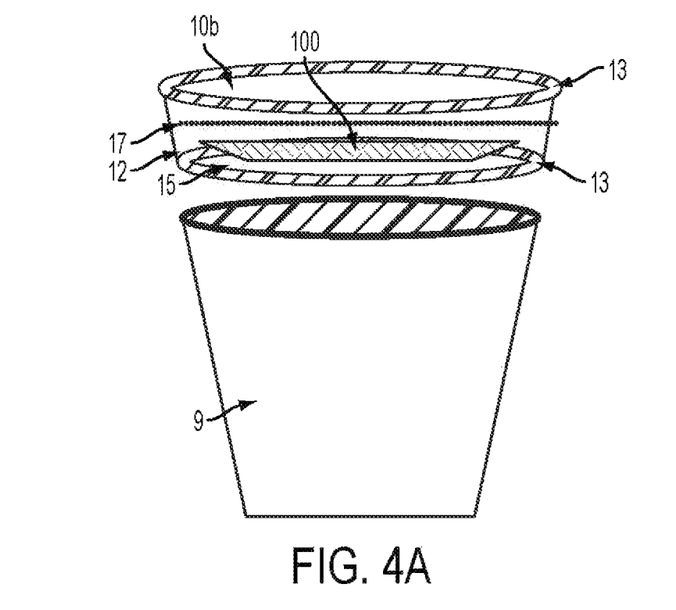
FIGS. 4A-B are perspective views of additive cartridges attached to a top portion of a brew cartridge according to various embodiments of the present invention.
Figure 4B:
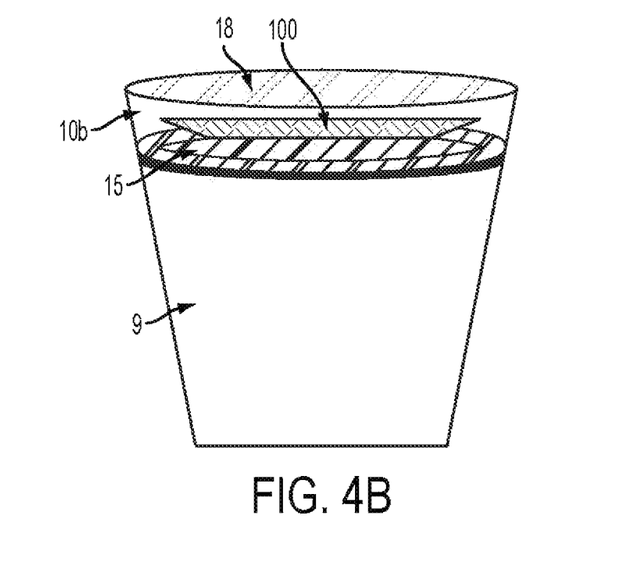
Figure 5A:
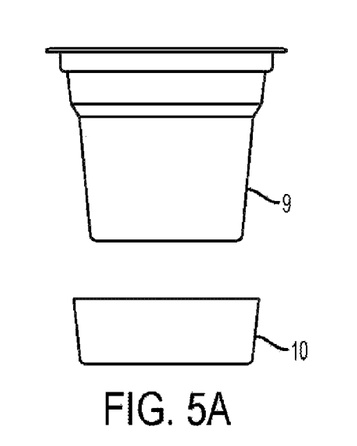
FIGS. 5A-I are perspective views of various shaped additive cartridges according to embodiments of the invention.
Figure 5B:
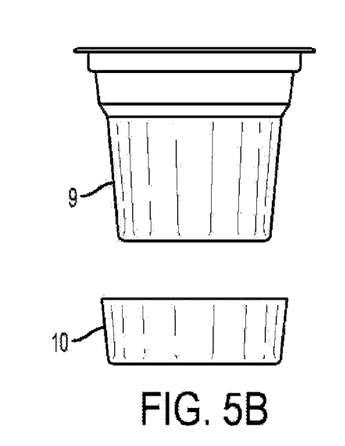
Figure 5C:
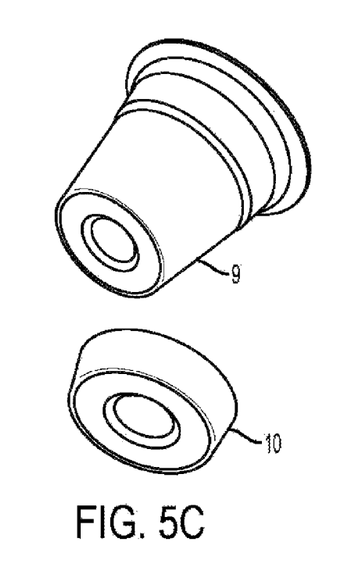
Figure 5D:
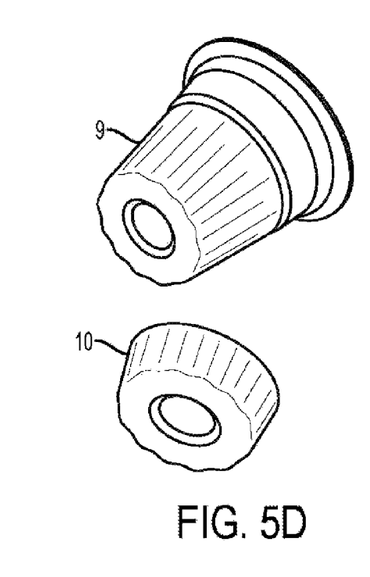
Figure 5E:
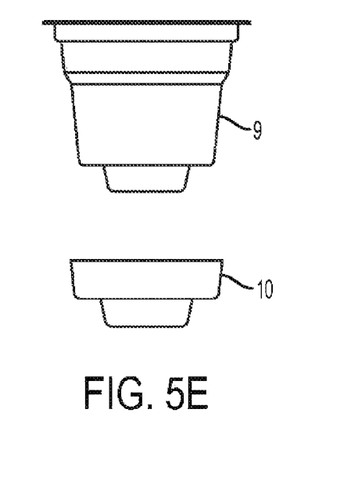
Figure 5F:
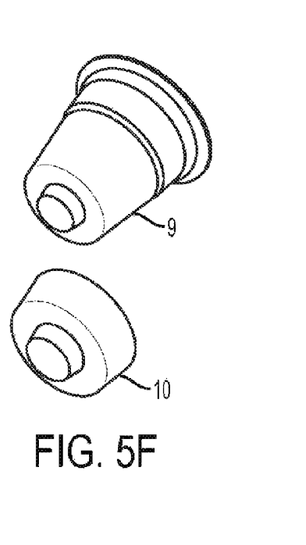
Figure 5G:
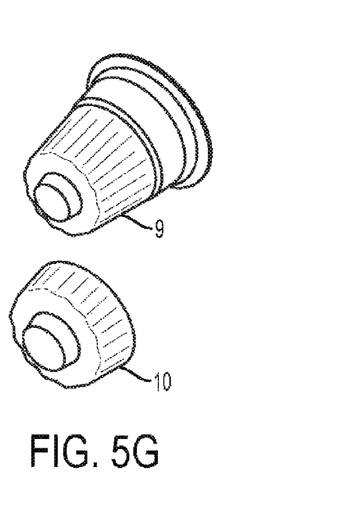
Figure 5H:
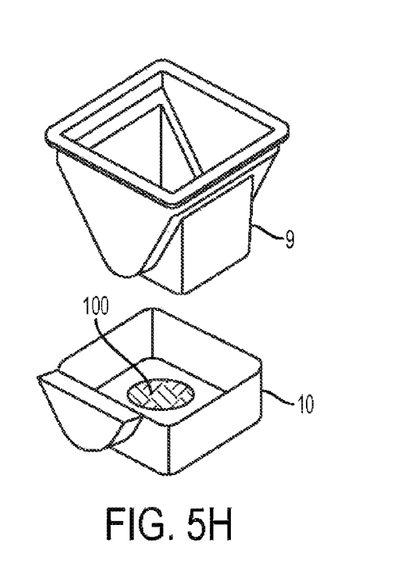
Figure 5I:
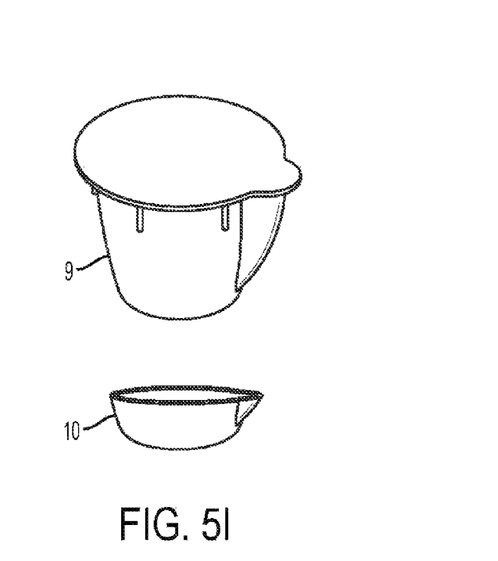

After the ingredient 100 added/flavored brewed fluid flow of the invention has been dispensed from the brewer 1, the lid 3 is opened via handle 5, and the beverage brew cartridge 9 and beverage additive cartridge(s) 10a of the invention may be removed as a single unit. In one or more embodiments of the invention, the additive cartridge(s) 10 (which are discussed in detail below) are made of a flexible material similar to that of the cup portion of brew cartridge 9, and have essentially the same dimensions as that of the lower portion of such brew cartridge 9. That is, the configurations of shape, size and dimensions of at least a portion of the cup-shaped brew cartridge 9 and additive cartridge 10a are essentially the same and equivalent, at least at either bottom portions thereof as shown in FIGS. 2A-3B or top portions thereof as shown in FIGS. 4A-B), to generate a friction fit there-between.

As the brew cartridge 9 is inserted into the instant additive cartridge 10a, pressure slightly deforms the sidewalls of one or both the brew cartridge and the additive cartridge so that the interior sidewalls of the additive cartridge 10a stretch over and tightly fit with or to the exterior sidewalls of the cup portion of beverage brew cartridge 9, or at least a portion thereof as shown in FIGS. 2A-3B (e.g., the bottom portion of the brew cartridge 9). The pressure of pushing these two essentially same sized cartridge 9, 10a portions together generates compression and friction that secures, fastens and attaches the brew cartridge 9 and additive cartridge 10a together. This type of fit is generally referred to as a friction fit, interference fit or press fit.

In addition to the friction fit by compression or pressure, in certain embodiments of the invention the friction fit may be further enhanced by the thermal expansion and contraction of the materials of the cup shaped cartridges 9 and 10a. That is, as hot water is dispensed from the inlet probe 7 into both the brew cartridge 9 and the additive cartridge 10a, such hot water causes the materials of the cartridges 9 and 10a to expand as the heated fluid flows there-through. After the heated fluid has been released from the cartridges, the material of such cartridges 9, 10a begin to cool and contract causing a tighter fit that increases the friction fit between the brew cartridge 9 and the additive cartridge 10a.

In still other embodiments of the invention, the tight fit between the brew cartridge 9 and the additive cartridge(s) 10 may be enhanced by an adhesion layer. This adhesion layer 20 may be provided on the brew cartridge 9 and/or additive cartridge 10 to enhance the bonding there-between. In one or more embodiments, the adhesion layer 20 preferably resides on an interior surface of a sidewall of the additive cartridge 10. The adhesion layer 20 may be any material that allows the two cartridges to adhere to one another including, but not limited to, glue, adhesive, tape, plastic, rubber (e.g., a rubber seal, o-ring, etc.), combinations thereof, and the like. The adhesion layer 20 may be dry prior to use of additive cartridge 10, and once wetted during use thereof, becomes activated to adhere cartridge 10 to exterior sidewalls of the brew cartridge 9. For instance, since sidewalls of additive cartridge 10a extend over at least a portion of exterior sidewalls of brew cartridge 9, the adhesion layer 20 may be provided on the inside sidewalls of additive cartridge 10a and/or exterior sidewalls of the brew cartridge 9 that make contact with the additive cartridge 10a interior sidewall (see, e.g., FIG. 3B).

In one or more alternative embodiments, rather than providing the additive cartridges 10 under a brew cartridge 9, additive cartridges 10b of the invention may be provided over a brew cartridge 9. Referring to FIGS. 1B and 4A-B, the additive cartridges 10b may be provided over, or on top of, a brew cartridge 9 residing in a brewer housing 4. As shown in FIG. 1B, in one or more embodiments, when the additive cartridge 10b is provided over the brew cartridge 9, such additive cartridge 10b may have at its underside circumferal outer edge sidewalls 12 that overhang sidewalls of at least a top portion of the brew cartridge 9.

A first layer 15 may reside at a first side of the additive cartridge 10b with the additive ingredient 100 (e.g., flavoring ingredient) residing between such first layer 15 and the top surface area of the underlying brew cartridge 9. This first layer 15 may be composed of a material including, but not limited to, a foil material, a filter material (e.g., paper, mesh, cloth, etc.), and the like. The additive ingredient 100 may be retained within the additive cartridge 10b via a filter material 17 as shown by dashed line in FIGS. 1B and 4A. The filter material may be any known filter material that allows fluid flow there-through including, but not limited to, a paper filter, a cloth filter, a mesh material, and the like.

During use of the additive cartridge 10b shown in FIG. 1B, a beverage brew cartridge 9 is inserted into the housing 4 of the brewer followed by additive cartridge 10b. An end-user may optionally attach the additive cartridge 10b to the top of the brew cartridge 9 prior to insertion into the brewer housing 4. As pressure is applied by closing the brewer lid 3, forces cause the additive cartridge 10b to be attached to a top portion of the brew cartridge 9 (or such forces cause the top portion of the brew cartridge 9 to be inserted into the additive cartridge 10b residing there-over). As discussed below, the additive cartridge 10b may have circumferal flanges that allow pressure to be applied thereto for adhering the additive and brew cartridges together. In the instant embodiments of the invention, sidewalls 12 of the additive cartridge overhang sidewalls of a top portion of the brew cartridge 9 so that the interior surfaces of the additive cartridge sidewalls 12 contact exterior surfaces of the brew cartridge 9. As discussed above, these sidewalls may adhere to one another by friction fit (i.e., interference fit or press fit), thermal expansion and contraction, an adhesion layer, any combination of the foregoing, and the like.

Upon closing the lid 3, in addition to the additive and brew cartridges 10b, 9 being secured together, the tubular inlet probe 7 pierces both the additive cartridge 10b and the brew cartridge 9 while the tubular outlet probe 8 pierces the bottom of the brew cartridge 9. In certain embodiments, the applied pressures from closing the lid and the probe insertions may cause the material of the first layer 15 of additive cartridge 10b to slightly concave, whereby as a fluid flow is provided into both the additive and brew cartridges 10b, 9 via inlet probe 7, a portion of such fluid slightly pools above, resides within or rises up into the additive cartridge 10b to contact the additive ingredient 100 residing therein. Alternatively, steam from the water flow may contain the ingredient to cause dissipation thereof for introduction into the underlying brew cartridge or in the housing 4 itself. The ingredient 100 is added (e.g., dispersed, dissolves, flows, etc.) to the fluid flow and provided into the underlying brew cartridge 9 and/or brewer housing. The material to be brewed in brew cartridge 9 is brewed with the fluid flow, including the fluid flow containing ingredient 100, to generate the ingredient 100 containing brewed fluid flow in accordance with the invention. This ingredient-brewed mixture fluid (e.g., a flavored, brewed fluid) flows out the brew cartridge 9 via outlet probe 8 and into an underlying receptacle 2. After use, when the additive and brew cartridges 10b, 9 are adhered together, such cartridges may be removed from the brewer 1 as a single unit.

As still other embodiments of the invention, the additive cartridge 10b of the invention may be provided over a brew cartridge 9 whereby a perimeter of the additive cartridge is substantially equivalent to a perimeter of the top surface area of the brew cartridge 9. That is, rather than having a portion of the flavoring cartridge 10b overhang the brew cartridge 9 as shown in FIG. 1B, the flavoring cartridge 10b may reside entirely on a top surface of, or over, the brew cartridge 9. Referring to FIGS. 4A-B the bottom surface area of the flavoring cartridge 10b shown therein, and a top surface area of the brew cartridge 9, may be substantially equivalent in size.

In these embodiments of the invention the flavoring cartridge 10b may be composed of a rigid or semi-rigid material that extends along sidewalls 12 thereof and inward towards the cartridge center as inwardly extending circumferal flanges 13. The inward flanges 13 reside at both the top surface and bottom surface of the flavoring cartridge. Further in these embodiments, the flavoring cartridge 10b is positioned over the brew cartridge 9 such that the first layer 15 resides at the bottom surface area of the flavoring cartridge 10b, while a second layer 18 resides at a top surface area of flavoring cartridge 10b. It should be appreciated and understood by one skilled in the art that the additive cartridge 10b embodiments of the invention shown in relation to FIGS. 1B and 4A-B may be the same cartridge and their positioning or placement relative to brew cartridge 9 within brewer housing 4 may be reversed (i.e., flipped upside down) in accordance with the description of the invention herein.

Referring again to FIGS. 4A-B, the first layer 15 is shown as residing at the bottom surface of the flavoring cartridge 10b. This bottom first layer 15 may be composed of a material including, but not limited to, the material of the flavoring cartridge itself, a foil material, a filter material (e.g., paper, mesh, cloth, etc.), or any other known or discoverable material that separates the ingredient 100 residing within the cartridge from the brew cartridge. Alternatively, the first layer 15 may be the material of the flavoring itself (e.g., a dissolvable flavoring material).

Optionally, the second layer 18 may be a top layer residing at the top surface of the flavoring cartridge 10b as shown in FIG. 4B. This top second layer 18 may be composed of a material including, but not limited to, a foil material, a filter material (e.g., paper, mesh, cloth, etc.), and the like. The top second layer 18 and/or first layer 15 may be a removable layer to protect and seal ingredient 100 prior to use thereof. In these embodiments the top layer 18 may be removed to expose ingredient 100 for use. The bottom first layer 15 and top second layer 18 may be adhered respectively to the circumferal bottom and top flanges 13 via any known adhesion layer. For instance, the first and second layers 15, 18 may each be a laminate of nylon, aluminum and a heat-seal lacquer used to bond the aluminum to the polyethylene flange material of the cartridges. In one or more further embodiments, the bottom flange 13 of additive cartridge 10b may optionally have an adhesion layer 20 residing on an exposed surface area thereof, which adheres such additive cartridge 10b to the brew cartridge 9 during use of these cartridges within the brewer housing.

During use of the additive cartridge 10b shown in FIGS. 4A-B, a beverage brew cartridge 9 may be inserted into brewer housing 4 followed by the additive cartridge 10b as shown in FIGS. 4A-B. The additive cartridge 10b may either simply rest on top of the brew cartridge 9, or in those embodiments having an adhesion layer on a bottom exposed surface of the bottom flange 13 such adhesion layer may secure or attach the additive cartridge 10b to the brew cartridge 9. Again, water and/or steam contacted to the adhesion layer during the brew cycle may activate the adhesion layer for securing the additive cartridge 10b to the brew cartridge 9.

As pressure is applied by closing the brewer lid 3, the upward and down forces also help in attaching the additive cartridge 10b to a top portion of the brew cartridge 9. In doing so, at least a portion of the bottom flange 13 of the additive cartridge is connected, secured to or adhered to flanges of the brew cartridge 9. The tubular inlet probe 7 pierces both the additive cartridge 10b and the brew cartridge 9 while the tubular outlet probe 8 pierces the bottom of the brew cartridge 9. In those embodiments having top layer 18 as shown in FIG. 4B, the applied pressures may cause the material of the first layer 15 to slightly concave, such that, the inlet fluid flow slightly pools above and within the additive cartridge 10b to contact the additive ingredient 100 residing therein. As described above, the ingredient 100 is added to the fluid flow and provided into the underlying brew cartridge 9 to output an ingredient-brewed mixture fluid (e.g., a flavored, brewed fluid) of the invention.

Referring to FIG. 4A, in those embodiments not having the top layer 18, or where such top layer 18 has been removed, the inlet probe 7 may pierce through the additive cartridge (i.e., through any filter 17 residing therein, through ingredient 100 and/or through the material of the cartridge 10 or layer 15). The inlet probe 7 also passes into the underlying brew cartridge 9 (or at least a top foil layer thereof), and fluid flow contacts both ingredient 100 within additive cartridge 10 and the material being brewed in brew cartridge 9 to generate the ingredient-brewed mixture fluid (e.g., a flavored, brewed fluid) of the invention. The additive and brew cartridges 10b, 9 may be removed as a single unit as described herein, or removed separately.

FIGS. 1A-4B show one or more embodiments of the additive cartridges 10 of the invention having a generally gradual tapering truncated conical shape that is substantially similar to the shape of a tapering truncated conical brew cartridge 9 to which it is to be contacted to, adhered to, or used in conjunction with. However, it should be appreciated that the instant additive cartridges 10 are not limited to such shapes, and may have any shape that allows the additive cartridges 10 of the invention to be contacted to, adhere to or used in conjunction with any known or yet to be discovered brew cartridge 9, regardless of whether the present additive cartridge(s) are being provided over the top and/or bottom of a brew cartridge. For instance, referring to FIGS. 5A-I, a variety of differently shaped and configured beverage brew cartridges 9 currently exist in the market.

Without deviating from the novel concepts of the invention, the present additive cartridge(s) 10 may be designed, shaped and configured to correspond to surfaces of a brew cartridge 9 to which it is to mate with. Additive cartridge(s) 10 of the invention preferably include at least means for retaining an ingredient 100 therein (that is to be added to fluid flow of the brew cartridge), in combination with at least one surface area of such cartridge 10 that secures the additive cartridge 10 to the brew cartridge 9 that it makes contact with.

As still another alternative, the additive cartridges 10 of the invention may have a shape and/or size different from the brew cartridge 9 with which it is to be used in conjunction therewith. In the various embodiments of the invention, a feature of the invention is that the present additive cartridges 10 may be used in conjunction with a brew cartridge 9 inside a brew housing to generate an ingredient-brewed mixture fluid outflow. In one or more embodiments, the additive cartridge 10 may or may not have sizes and configurations equivalent to the brew cartridge 9, and/or may or may not fasten or secure to the brew cartridge 9 (e.g., the additive cartridge 10 may reside adjacent to the brew cartridge 9 without making contact therewith.

FIGS. 6A-8B show additional details of the various embodiments of the invention. As is shown, the present additive cartridge(s) 10 retain an ingredient 100 within at least one compartment of the cartridge 10. The ingredient may optionally be secured within a second compartment of the additive cartridge 10 by a filter material 17 as shown at least in FIGS. 4A, 6A and 6C. Again, the filter material 17 may be any known filter material that allows fluid flow there-through including, but not limited to, a paper filter, a cloth filter, a mesh material, and the like.

The ingredient 100 provided within the additive cartridge 10 may be prepackaged into the cartridge 10, such as, when the additive cartridges of the invention are single-use disposable cartridges. It should be appreciated that components of the additive cartridge 10 may be composed of biodegradable and/or compostable materials. Alternatively, the present cartridges 10 may be either disposable and/or reusable, and an end-user may select from a variety of different ingredients and manually add one or more ingredients to the present additive cartridges. As such, the various additive cartridges 10 of the invention may contain a single additive ingredient, or a plurality of different additive ingredients.

In accordance with the various embodiments of the invention, the ingredient(s) 100 within additive cartridges 10 may be any constituent for adding to a liquid flow of/from a brew cartridge. While not meant to limit the invention, the ingredients may include, but are not limited to, a flavoring agent, an ingredient(s), a vitamin, a medicament, a coloring agent, a sweetening agent, a lightening agent, a flavored lightening agent, an extract, a concentrate, etc., or even any combination (s) of the foregoing. The ingredient(s) 100 may be in any physical form that is able to be retained within the additive cartridge 10 including, but not limited to, a liquid, gel, powder, particulate, solid, crystalline, vapor, flavor packet, etc., or even any combinations of the foregoing. In additive cartridges 10 that are prepackaged, the cartridge preferably has a top layer 18 that hermetically seals the cartridge and the ingredient 100 residing therein.

Figure 6A:
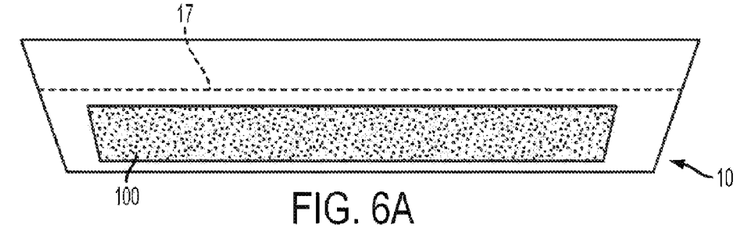
FIGS. 6A-B are side views of one or more embodiments of additive cartridges of the invention having an ingredient therein that is to be added to fluid flow of a brew cartridge.
Figure 6B:
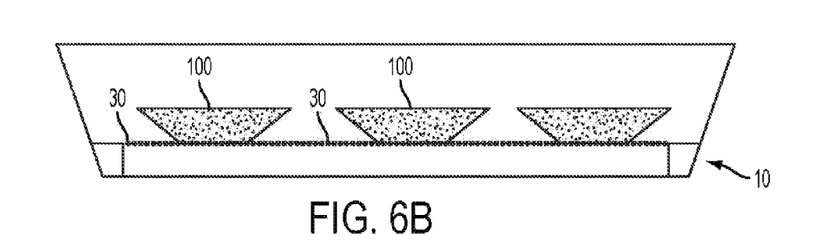

Referring to FIG. 6A, the ingredient 100 may be a single unit that is provided inside the additive cartridge 10. Alternatively, a plurality of ingredient 100 units may be provided within the additive cartridge 10, as is shown in FIG. 6B. Each of these units may contain a single ingredient or a plurality of ingredients in combination with one another. As shown in FIG. 6A the ingredient 100 may contact a bottom interior surface of the additive cartridge 10, or it may be raised above and not contact the bottom interior surface of the additive cartridge 10 prior to use thereof as shown at least in FIGS. 6B-C.

Figure 6C:
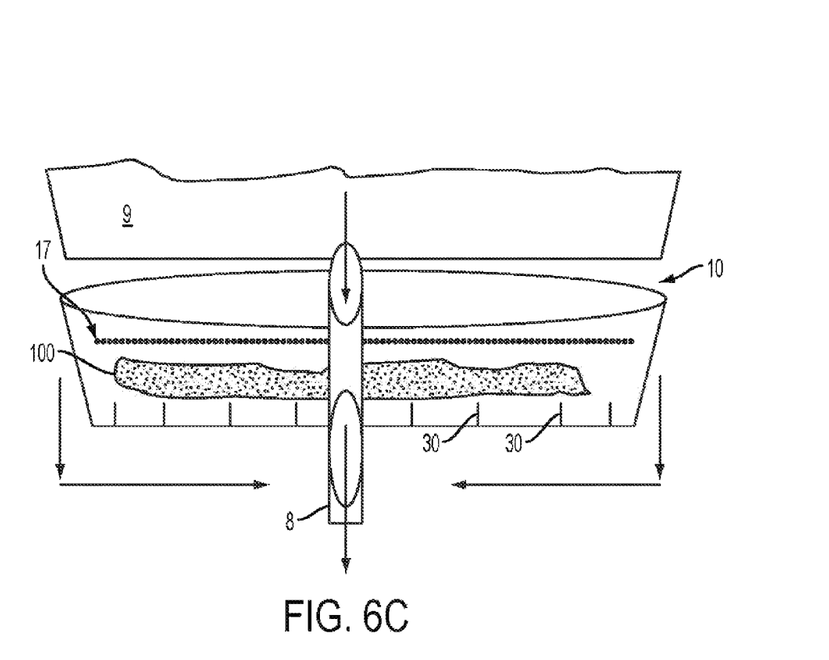
FIG. 6C is a perspective view of one or more additive cartridges of the invention in the process of being attached to a brew cartridge.

In the embodiments of FIGS. 6B-C, a lifting component 30 may be provided in the additive cartridge. This lifting component 30 is preferably adjacent to, and may contact, the bottom surface of the cartridge 10 to provide an open space between a location where ingredient 100 resides, or is to be provided, and the cartridge interior bottom surface. As fluid flows into cartridge 10, such fluid contacts a top surface of the ingredient 100 and flows under such ingredient 100 to contact the bottom surface thereof. As such, fluid flows both above and under ingredient 100 to increase the amount of such ingredient 100 that is dissolved, dispensed or dispersed into the fluid flow for providing an ingredient-brewed mixture fluid outflow in accordance with the invention.

Figure 7A:
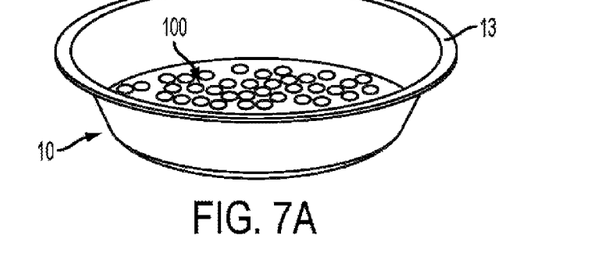
FIGS. 7A-D are perspective views different additive cartridges having an ingredient therein according to one or more embodiments of the present invention.
Figure 7B:
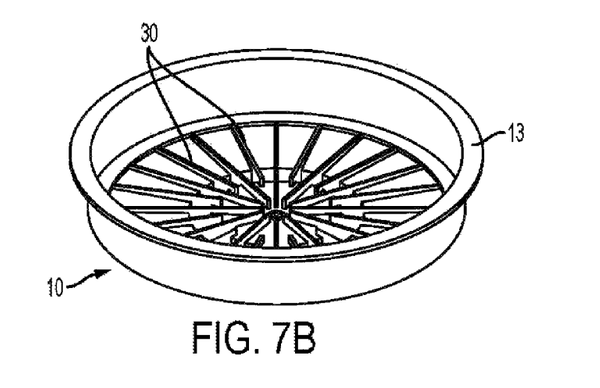
Figure 7C:
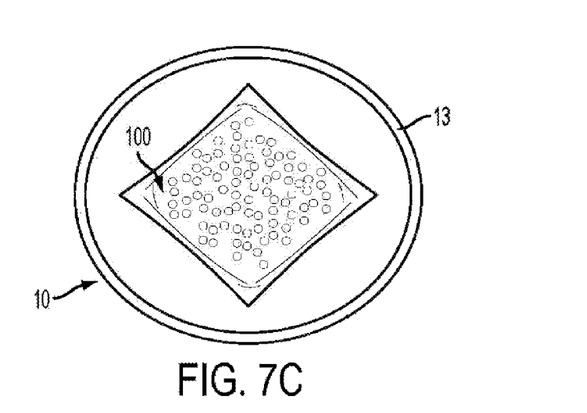
Figure 7D:
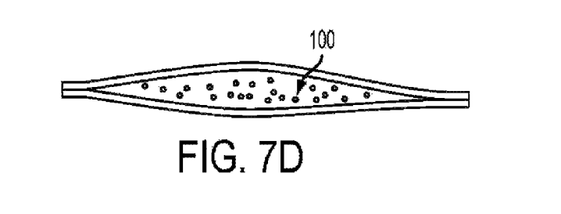

For ease of understanding the invention, FIGS. 6C and 7A-B show one or more examples of the invention. As shown, an additive cartridge 10 having a plurality of longitudinally raised legs as a lifting component 30, with each leg extending from interior sidewall surfaces of the cartridge towards the center thereof. The ingredient 100 may be a gelatinous mass that rests on top of such raised legs whereby fluid flows along channels of adjacent pairs of legs and contacts the underside of ingredient 100 while fluid also flows over a top surface of such ingredient 100 and makes contact therewith. As still other examples of the invention, the ingredient 100 may be a flavoring packet as shown in FIGS. 7C-D that is placed directly onto a bottom surface area of the interior of the additive cartridge 10. The fluid flows over the flavoring packet and penetrates through a filter material of such packet to contact the ingredient 100 residing therein. It should be appreciated that these figures are used to show examples of one or more embodiments of the invention, and in no manner are meant to limit the invention. Numerous different ingredients 100 and lifting components 30 are envisioned by the scope of the present invention. As still other examples of the invention.

Figure 8A:
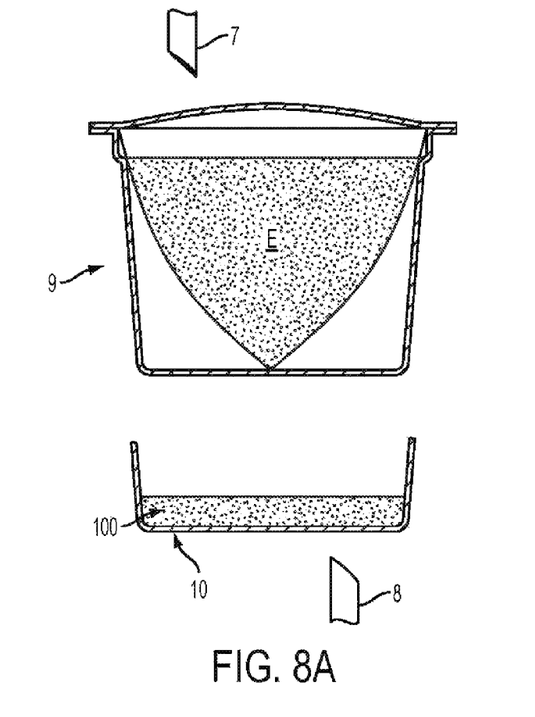
FIG. 8A is a perspective view of an additive cartridge of the invention and a conventional brew cartridge prior to use of such additive cartridge in accordance with the invention.
Figure 8B:
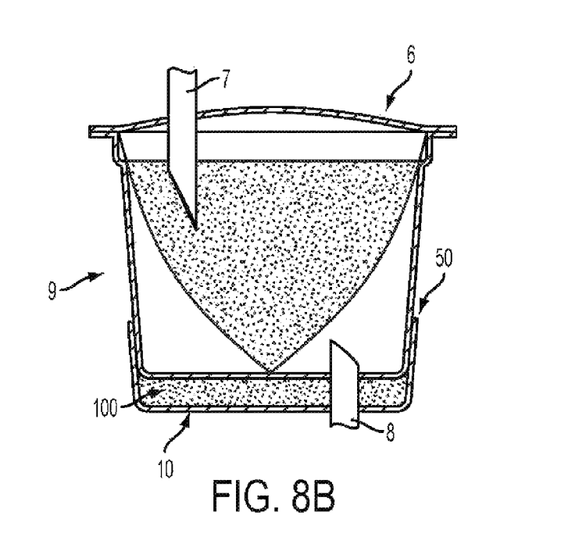
FIG. 8B is a perspective view of FIG. 8A after the additive cartridge and brew cartridge have been attached together, whereby a brewed fluid flows from the brew cartridge contacts the ingredient within the additive cartridge and generates an brewed-ingredient mixture that outflows from the brewer housing.

Referring to FIGS. 6C and 8A-B, an additive cartridge 10 may be provided under a brew cartridge 9 whereby after closing a lid of a brewer housing the brew cartridge 9 and additive cartridge 10 are adhered together at a circumferal attachment location 50. The top inlet probe 7 of the brewer pierces a top foil layer of the brew cartridge, and a bottom outlet probe 8 pierces bottom surfaces of both the additive cartridge 10 followed by the brew cartridge 9. The rigid or semi-rigid material of the additive cartridge 10 may include, but is not limited to, any combination of polystyrene, ethylene vinyl alcohol and polyethylene. As discussed in detail above, the fluid flow contacts and brews the material residing in the brew cartridge and then flows into the additive cartridge for mixing thereof with ingredient 100 residing therein. The additive cartridges of the invention are not restricted in use to a single orientation, can be pierced for input and output flow, and are sealed for freshness and against contamination.

Since many manufacturers and/or sellers of brew beverages are limited by the variety of flavored beverages they can manufacture and sell, the various embodiments of the invention provide a solution thereto by allowing an end user create his own flavored beverage using a base or brew cartridge of his preference in combination with one or more flavoring cartridges or packets of the invention. For instance, several coffee manufacturers and sellers only sell a limited number of flavored coffees. While there are a variety of different flavored coffees available, a consumer may not like the underlying base coffee used to make the flavored coffee.

As an example, while many consumers enjoy Brand A coffee, such Brand A coffee does not sell flavor "X" coffee. Brand B sells flavor "X" coffee, however, Brand B's underlying coffee base from which flavor "X" coffee is made is too strong for many consumers. As such, consumers will not buy Brand B's flavor "X" coffee. In accordance with the various embodiments of the invention, a consumer may now buy their preferred Brand A coffee and brew it in combination with one or more of the instant additive cartridges 10 (here a flavoring cartridge) to add flavor "X" to such coffee. The resultant out-flowing coffee is Brand A flavor "X" coffee.

The various embodiments of the invention also solve the problem of flavoring cross-contamination at manufacturing facilities, since the end user is now able to desirably select and create his own flavored beverages and/or liquid meals (e.g., soup).

It should also be appreciated that while the invention has been described herein as the brew cartridge 9 and additive cartridge 10 being separate cartridges that are attached together for brewing a beverage, the invention also includes and envisions embodiments wherein the brew and additive cartridges 9, 10 are manufactured and sold as a single unit (see, e.g., FIG. 4B may be envisioned as a single unit cartridge having both an additive chamber and a brew chamber). In these embodiments a brew chamber may be separated from an additive chamber (e.g., a flavoring chamber), whereby ingredient 100 is prepackaged within such chamber, or there is an opening or inlet that allows an end user to selectively add his own ingredients therein. These embodiments of the combined brew and additive cartridges 9, 10 may be made as disposable single-use cartridges, or they may be reusable cartridge(s). In still other embodiments, the ingredient 100 may be provided directly within the brew cartridge so that the brewing component and ingredient are brewed together simultaneously. It should also be appreciated that the additive cartridges 10 of the invention may be provided with one or more tabs extending from sidewalls thereof to assist in the removal of such cartridge 10 from the housing 4 if required.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:
1. A beverage additive cartridge, comprising:
   a container having at least a first surface area comprising a rigid, piercable continuous surface with no openings residing therein prior to use thereof, and rigid sidewalls extending from said first surface area, the first surface area and rigid sidewalls comprising a same material;

a portion of the container being in communication with a sealed beverage brewing cartridge that is separate and distinct from said container; and an ingredient residing inside the container that is added to a brewed fluid flow of the beverage brewing cartridge to generate an ingredient-brewed fluid mixture, whereby the container having the ingredient comprises a single-serve beverage additive cartridge.

2. The beverage additive cartridge of claim 1 wherein the first surface area comprises a bottom surface area of the container with upwardly extending sidewalls, a portion of an interior surface area of said sidewalls comprising the portion of the container that is in communication with the beverage brewing cartridge.

3. The apparatus of claim 1 wherein the portion of the container that is in communication with the beverage brewing cartridge is a friction fit between contact of interior surface areas of the container sidewalls with exterior surface areas of the beverage brewing cartridge.

4. The beverage additive cartridge of claim 1 further including a layer on a top surface area of the container that hermetically seals the beverage additive cartridge and the ingredient residing therein prior to use thereof.

5. The beverage additive cartridge of claim 1 wherein the container is a single-serve disposable beverage additive cartridge.

6. The beverage additive cartridge of claim 1 wherein the container is a reusable single-serve beverage additive cartridge.

7. A beverage brewing apparatus for use in a single serve beverage brewing machine, the beverage brewing apparatus comprising:
   a beverage brewing cartridge that is sealed and containing a material to be brewed;
   a beverage additive cartridge having at least a first rigid, piercable continuous surface area with no openings residing therein prior to use thereof and sidewalls extending from said first surface area, the beverage brewing cartage and the beverage additive cartridge being two separate distinct cartridges;
   an ingredient residing in the beverage additive cartridge, the ingredient being a material capable of being added to a brewed fluid of the beverage brewing cartridge to generate an ingredient-brewed fluid mixture; and
   a connection that provides the beverage additive cartridge in communication with the beverage brewing cartridge, wherein at least the beverage additive cartridge has one or more physical properties at enables the beverage additive cartridge to adhere to the beverage brewing cartridge at said connection during use of both said beverage additive cartridge and said beverage brewing cartridge within the single serve beverage brewing machine.

8. The apparatus of claim 7 wherein the connection that provides the beverage additive cartridge in communication with the beverage brewing cartridge is a fastening means that secures the beverage additive cartridge to the beverage brewing cartridge.

9. The apparatus of claim 7 wherein the ingredient is selected from the group consisting of a flavoring agent, an ingredient, a vitamin, a medicament, a coloring agent, a sweetening agent, a lightening agent, a flavored lightening agent, an extract, a concentrate, and combinations thereof.

10. The beverage additive cartridge of claim 7 wherein the ingredient is in a physical form selected from the group consisting of a liquid, gel, powder, particulate, solid, crystalline, vapor, flavor packet, and combinations thereof.

11. The apparatus of claim 7 further including a lifting component inside the beverage additive cartridge, the ingredient residing on the lifting component to allow fluid to contact top and bottom surfaces of the ingredient.

12. The apparatus of claim 7 further including a filter material residing between a second surface area of the beverage additive cartridge and the first surface area of the beverage additive cartridge to provide a chamber, the ingredient residing within the chamber.

13. The apparatus of claim 7 wherein the ingredient is selected from the group consisting of a single ingredient or a combination of two or more ingredients.

14. The apparatus of claim 7 wherein the beverage additive cartridge and the beverage brewing cartridge are shaped and sized to fit inside a housing of a single-serve brew machine.

15. The apparatus of claim 7 wherein the connection comprises a friction fit attachment via contact of at least a portion of a surface area of the beverage additive cartridge with at least a portion of a surface area of the beverage brewing cartridge.

16. The apparatus of claim 7 wherein the connection comprises an adhesion layer residing on a surface of the beverage additive cartridge.

17. The apparatus of claim 7 wherein the beverage additive cartridge resides over the beverage brewing cartridge in a housing of a brew machine.

18. The apparatus of claim 7 wherein the beverage additive cartridge resides below the beverage brewing cartridge in a housing of a brew machine.

19. The apparatus of claim 7 further including a layer on a top surface area of the beverage additive cartridge that hermetically seals the beverage additive cartridge and the ingredient residing therein.

20. A brewing additive cartridge used in combination with a beverage brewing cartridge containing a material to be brewed in a single serve beverage brewing machine, the brewing additive cartridge comprising:
   a beverage additive cartridge including a rigid continuous bottom surface area with no openings therein connected to rigid sidewalls extending upwardly from the bottom surface area, and a top surface having an upper flange protruding outward from a top of the sidewalls, whereby the bottom surface area, sidewalls and upper flange comprise a single structure of a single material;
   an ingredient residing in the beverage additive cartridge, the ingredient being a material that mixes with a brewed fluid of the beverage brewing cartridge to generate an ingredient-brewed fluid mixture;
   a removable layer residing at the top surface of the beverage additive cartridge, the removable layer contacting and adhering to an upper surface area of the top surface flange, the removable layer seals the beverage additive cartridge and the ingredient residing therein prior to use thereof; and
   a connection portion of the beverage additive cartridge that secures the beverage additive cartridge to the beverage brewing cartridge for generating the ingredient-brewed fluid mixture and allowing for the simultaneous removal of the beverage additive cartridge together with the beverage brewing cartridge from the single serve beverage brewing machine.

* * * * *